Patented Dec. 22, 1942

2,306,349

UNITED STATES PATENT OFFICE 2,306,349

REFRACTORY AND METHOD OF MAKING THE SAME

Eugene Wainer, Niagara Falls, N. Y., assignor to The Titanium Alloy Manufacturing Company, New York, N. Y., a corporation of Maine No Drawing. Application April 18, 1940, Serial No. 330,373

23 Claims. (Cl. 106—57)

This invention relates to zirconium oxide refractories and the method of making the same.

In the field of special refractory materials, zirconium dioxide has long been of primary interest for several reasons, such as its extremely high melting point (approximately 2750° C.) and its chemical inertness in the presence of fluid slags differing widely in chemical nature. However, there are several difficulties connected with its use which it has hitherto been impossible to overcome. One of these difficulties is due to an allotropic change taking place at 1000° to 1050° C., the transfer being from the monoclinic crystalline system to the hexagonal on the rising temperature scale, such allotropic change being accompanied by a sudden increase in volume of approximately 1%. This sudden volume change is usually sufficient to completely disrupt a tight refractory structure. Normally the structure failure can be obviated only by passing through the temperature range involving the allotropic change with extreme slowness, a completely undesirable practice commercially. Another difficulty is that the very high melting point of zirconia coupled with its chemical inertness, makes the choice of a proper bond an extremely difficult one. Zirconia can be vitrified only by firing close to its melting point, a precedure which has been accomplished in the past on a laboratory scale but is obviously not practical commercially.

Refractories may be formed by a number of procedures, such as pressing, ramming, soft mud molding cement casting, jiggering, slip casting, etc. Of these, by far the most satisfactory for the fabrication of special shapes is slip casting, usually carried out in plaster of Paris molds. In order that a material may be amenable to formation by slip casting procedures, it must possess a high degree of plasticity or fluidity when mixed with relatively small quantities of liquids, i. e. that slips formed therefrom be well deflocculated. Zirconium dioxide of the type suitable for refractory application cannot be properly deflocculated when merely mixed with water. It has been possible to prepare zirconium dioxide in a plastic form suitable for slip casting by extensive wet grinding of dense zirconia until a considerable portion of the batch is reduced to colloidal size, still further reducing the particle size by prolonged digestion of the milled batch with strong acids at elevated temperatures, thus peptizing some of the particles, eliminating acid by washing with water, and drying the batch. The result is a plastic zirconia which can be formed by slip casting in porous molds. However, this procedure is of academic interest only because of the excessive expense.

It is therefore an object of this invention to cheaply and effectively impart the necessary plasticity to a zirconia refractory composition, so that it can be formed by slip casting procedures. It is another object to impart special properties to the casting slip so that thick walled structures, massive solid structures, light weight very thin walled structures, etc., and in fact literally every type of structure used in refractory applications, can be formed easily, adequately and cheaply. It is a further object to eliminate the danger of disruption due to allotropic volume changes. A still further object is to provide bonding agents for zirconia refractories of such a nature that hard tough dense bodies will be formed at usually available temperatures, said bonding agents being completely compatible with the slip casting technique. Further objects will appear hereinafter.

These objects are accomplished by adding to a zirconia composition, suitable for forming refractory articles, from 2% to 8% of a low melting point glass. When forming refractory articles by slip casting procedures, extremely minute quantities of certain alkali pyrophosphates have been found extremely effective as deflocculants. Finally, the addition of small amounts of certain substances to slips containing such deflocculants have been found effective in modifying the action of these deflocculants for certain purposes.

One of the most suitable zirconia materials for refractories is the type known commercially as electrically fused zirconia, and it is preferred to use this material in the practice of the present invention. It is an extremely hard dense material of high chemical purity which exhibits to the fullest extent the properties of high melting point, chemical inertness, nonplasticity, allotropic volume changes, etc., which make the fabrication of a commercially useful structure difficult if not impossible. This fused zirconia may be prepared by subjecting fairly pure high bulking zirconia to electric arc temperatures, fusing the zirconia to a compact mass, cooling, crushing and calcining to eliminate residual carbon, and then crushing or grinding to sizes suitable for refractory formation. Such a zirconia will analyze 99.0 to 99.7 zirconia content, and is usually yellow or salmon red. Such fused zirconia may be used in a variety of mesh sizes or a variety of combinations of mesh sizes. For example, for very tight thin walled structures, minus 200 mesh or minus 325 mesh zirconia is usually used. For massive structures a mixture of 50 parts minus 325 mesh material and 50 parts minus 40 plus 100 mesh zirconia is used. The coarser the mesh sizes used the lower the firing shrinkage and the more resistant the structure is to failure by heat shock.

In order to impart to water dispersions of zirconia the necessary deflocculation characteristics so that ware may be formed by slip casting procedures, minute additions of certain alkali pyrophosphates have been found extremely effective. Additions of these pyrophosphates in quantities from 0.01% to 0.1% are completely effective, and preferred in practice, although higher amounts, such as 0.2%, may be used. These alkali phosphates have become commercially available in the last few years and differ from the ordinary commercial phosphates and pyrophosphates in that they are normally supplied in the anhydrous condition, that they are formed by fusion at high temperature, and that they vary in composition between $Na_4P_2O_7$ (tetrasodium pyrophosphate) and $Na_6P_4O_{13}$ (hexametasodium pyrophosphate). Other alkali metals can conveniently replace the sodium. All these materials are effective agents as deflocculants for zirconia.

The employment of these alkali pyrophosphates, together with zirconia, in a slip is not sufficient to secure a suitable refractory. In addition to these materials, a bonding agent must be employed, to prevent disintegration and cracking of the piece upon firing. Of course if it were commercially practical to heat these refractories to their melting points it might even be possible to do without these bonding agents, but as a matter of practice they are necessary. In accordance with this invention, it is preferred to employ as the bonding agent a minor quantity, preferably 2% to 8%, of a low melting point glass. Not only is a proper bonding secured by the use of such a glass, but also the structure rupture due to the allotropic volume change is eliminated. The chemical composition of these low melting point glasses is not important, except insofar as they harmfully affect or are affected by the materials with which the refractories may come into contact. The glass, however, must melt or soften materially at or below 1700° F. A glass of suitable analysis is as follows: NaKO 5.21, CaO 6.00, BaO 8.00, ZnO 16.00, $CaF_2$ 4.00, $B_2O_3$ 10.00, $Al_2O_3$ 1.00, $SiO_2$ 39.79, $ZrO_2$ 10.00. Such a glass has a melting point of 1500° F. Another suitable glass has the following analysis: NaKO 10.36, CaO 20.20, $B_2O_3$ 23.25, $SiO_2$ 46.15. Such a glass has a melting point of 1300° F. The usual soda lime glasses remelted with 5% to 20% $B_2O_3$ are effective bonds. The same is true if a high melting point, high silica soda-alumino-borate glass, such as that known under the trade name "Pyrex," is remelted with 5% to 20% $B_2O_3$.

These glass bonds appear to operate as follows: When used in proper amounts, the softening of the bond which takes place below the temperature at which the allotropy becomes evident imparts sufficient elasticity to the structure to enable it to stretch without structural failure even when the critical temperature range is passed through quite rapidly. On cooling, the high cold strength of glasses is operative and a very hard tough structure is obtained. On operation at very high temperatures, such as 3500° to 4500° F., the alkalis, borates, fluorides, etc. tend to boil out leaving a residuum of very high melting point. By judicious selection of amount of bond, the high temperature characteristics of zirconia are not impaired.

Using a combination of zirconia plus glass bond plus the above alkali pyrophosphates as deflocculant, and adding between 12 and 18 cc. of water per 100 grams of powder, a slip is formed which is very suitable for casting heavy massive structures or hollow members with heavy walls. With such a slip, however, thin walled or fragile structures cannot be made, due partially to the relatively low green strength of such structures before firing. By the addition of a very small quantity, such as 0.005% to 0.1%, of such materials as bentonite, sodium fluosilicate, sodium silicate, plaster of Paris, gelatine, sodium alginate, and water soluble gums generally, such as gum arabic, gum tragacanth, dextrine, or a mixture of two or more of these materials, to the combination of zirconia, glass bond, alkali phosphate and water, it is possible to make practically any type of structure now used for refractory applications. All the inorganic materials are powerful aids when very thin walled slow forming ware is to be made. Sodium fluosilicate, sodium silicate and sodium alginate aid in deflocculation when used in combination with the alkali phosphates and at the same time aid in the fabrication of thin walled ware. Sodium alginate and the water soluble gels and gums not only aid in the formation of thin walled ware but markedly increase the green strength of the undried piece. All these materials are characterized by their marked affinity for water or their ability to form gels. Their action is probably that they aid in retaining water in the structure to prevent too rapid drying thereof.

Instead of the above mentioned materials, boric acid or water soluble borates may be added in minute amounts to increase green strength.

The slips thus prepared are molded in the plaster of Paris molds in the usual manner as well known in the ceramic arts. The molded pieces are dried and fired to 2400° to 2600° F.

Examples of compositions for practicing the present invention are as follows. In each case, the ingredients are thoroughly mixed, cast into a mold, removed therefrom, dried and fired to 2400° to 2600° F.

*Example 1*

For slip casting massive structures, such as bricks, blocks, etc. (coarse structured):

|  | Pounds |
|---|---|
| —325 mesh electrically fused zirconia | 50 |
| —40+100 mesh electrically fused zirconia | 50 |
| —325 mesh low melting point glass | 3 |
| Tetrasodium pyrophosphate | 0.05 |
| Water | 11.0 |

*Example 2*

For slip casting massive structures, such as bricks, blocks, etc. (fine structured):

|  | Pounds |
|---|---|
| —325 mesh electrically fused zirconia | 100 |
| —325 mesh low melting point glass | 4 |
| Tetrasodium pyrophosphate | 0.05 |
| Water | 15.0 |

Examples 1 and 2 are adapted to very rapid mold turnover since water is absorbed with extreme rapidity.

Example 3

For casting thin walled hollow structures or thin plates, bars, etc.:

| | Pounds |
|---|---|
| −325 mesh electrically fused zirconia | 100 |
| −325 mesh low melting point glass | 4 |
| Tetrasodium pyrophosphate | 0.05 |
| Bentonite | 0.03 |
| Or sodium fluosilicate | 0.02 |
| Or sodium silicate | 0.02 |
| Or calcium aluminum silicate (Portland cement) | 0.02 |
| Or sodium alginate | 0.01 |
| Or gum tragacanth or other water soluble gum | 0.01 |
| Or gelatine or dextrine | 0.01 |
| Water | 15.0 |

The gel materials such as sodium alginate, tragacanth, gelatine or dextrine, are added in the dissolved state in the water addition.

Example 4

For casting thin walled hollow structures or thin plates, bars, etc.:

| | Pounds |
|---|---|
| −325 mesh electrically fused zirconia | 100 |
| −325 mesh low melting point glass | 4 |
| Tetrasodium pyrophosphate | 0.05 |
| Bentonite | 0.02 |
| Boric acid | 0.02 |
| Or sodium alginate, or water soluble gum such as gum tragacanth or gum arabic, or water soluble gel such as gelatine or dextrine | 0.01 |
| Water | 15.0 |

The finished ware finds utility as a refractory in the manufacture of special glasses, particularly the high silica type, in the fusion of clear quartz, as a buttress against corrosive slags such as molten phosphates and fluophosphates, etc. It is generally resistant to most slags whether acid, basic or neutral.

As many variations are possible within the scope of this invention, it is not intended to be limited except as defined by the appended claims.

What is claimed is:

1. A composition suitable for forming refractory structures comprising a major quantity of zirconium oxide, a minor quantity of a glass melting or softening below 1700° F., a minor quantity of an alkali metal pyrophosphate having an empirical composition between $M_4P_2O_7$ and $M_6P_4O_{13}$, where M represents an alkali metal, and water.

2. A composition suitable for forming refractory structures comprising a major quantity of zirconium oxide, a minor quantity of a glass melting or softening below 1700° F., a minor quantity of a sodium pyrophosphate having an empirical composition between $Na_4P_2O_7$ and $Na_6P_4O_{13}$, a minor quantity of a material taken from the class consisting of gelatine, sodium alginate, gum arabic, gum tragacanth, and dextrine, the quantity of said last mentioned material and of said pyrophosphate being less than said glass, and water.

3. A composition suitable for forming refractory structures comprising a major quantity of zirconium oxide, 2% to 8% of a glass melting or softening below 1700° F., 0.01% to 0.1% of a sodium pyrophosphate having an empirical composition between $Na_4P_2O_7$ and $Na_6P_4O_{13}$, and water.

4. A composition suitable for forming refractory structures comprising a major quantity of zirconium oxide, 2% to 8% of a glass melting or softening below 1700° F., 0.01% to 0.1% of a sodium pyrophosphate having an empirical composition between $Na_4P_2O_7$ and $Na_6P_4O_{13}$, 0.005% to 0.1% of a material taken from the class consisting of gelatine, sodium alginate, gum arabic, gum tragacanth, and dextrine, and water.

5. A composition suitable for forming refractory structures comprising a major quantity of zirconium oxide and a minor quantity of a glass melting or softening below 1700° F.

6. A composition suitable for forming refractory structures comprising a major quantity of zirconium oxide and 2% to 8% of a glass melting or softening below 1700° F.

7. A composition suitable for forming refractory structures comprising a major quantity of zirconium oxide, a minor quantity of an alkali metal pyrophosphate having an empirical composition between $M_4P_2O_7$ and $M_6P_4O_{13}$, where M represents an alkali metal, and water.

8. A composition suitable for forming refractory structures comprising a major quantity of zirconium oxide, a minor quantity of a sodium pyrophosphate having an empirical composition between $Na_4P_2O_7$ and $Na_6P_4O_{13}$, a minor quantity of a material taken from the class consisting of gelatine, sodium alginate, gum arabic, gum tragacanth, and dextrine, and water.

9. A composition suitable for forming refractory structures comprising a major quantity of zirconium oxide and 0.01% to 0.1% of a sodium pyrophosphate having an empirical composition between $Na_4P_2O_7$ and $Na_6P_4O_{13}$, and water.

10. A composition suitable for forming refractory structures comprising a major quantity of zirconium oxide, 0.01% to 0.1% of a sodium pyrophosphate having an empirical composition between $Na_4P_2O_7$ and $Na_6P_4O_{13}$, 0.005% to 0.1% of a material taken from the class consisting of gelatine, sodium alginate, gum arabic, gum tragacanth, and dextrine, and water.

11. A composition suitable for forming refractory structures comprising a major quantity of zirconium oxide, a minor quantity of a glass melting or softening below 1700° F., a minor quantity of a sodium pyrophosphate having an empirical composition between $Na_4P_2O_7$ and $Na_6P_4O_{13}$, bentonite, and water.

12. A composition suitable for forming refractory structures comprising a major quantity of zirconium oxide, 2% to 8% of a glass melting or softening below 1700° F., 0.01% to 0.1% of a sodium pyrophosphate having an empirical composition between $Na_4P_2O_7$ and $Na_6P_4O_{13}$, 0.005% to 0.1% of bentonite, and water.

13. A composition suitable for forming refractory structures comprising a major quantity of zirconium oxide, a minor quantity of a sodium pyrophosphate having an empirical composition between $Na_4P_2O_7$ and $Na_6P_4O_{13}$, bentonite, and water.

14. A composition suitable for forming refractory structures comprising a major quantity of zirconium oxide and 0.01% to 0.1% of a sodium pyrophosphate having an empirical composition between $Na_4P_2O_7$ and $Na_6P_4O_{13}$, 0.005% to 0.1% of bentonite, and water.

15. A composition suitable for forming refractory structures comprising a major quantity of zirconium oxide, a minor quantity of a glass melting or softening below 1700° F., a minor quantity of a sodium pyrophosphate having an empirical composition between $Na_4P_2O_7$ and $Na_6P_4O_{13}$, sodium silicate, and water.

16. A composition suitable for forming refractory structures comprising a major quantity of zirconium oxide, 2% to 8% of a glass melting or softening below 1700° F., 0.01% to 0.1% of a sodium pyrophosphate having an empirical composition between $Na_4P_2O_7$ and $Na_6P_4O_{13}$, 0.005% to 0.1% of sodium silicate, and water.

17. A composition suitable for forming refractory structures comprising a major quantity of zirconium oxide, a minor quantity of a sodium pyrophosphate having an empirical composition between $Na_4P_2O_7$ and $Na_6P_4O_{13}$, sodium silicate, and water.

18. A composition suitable for forming refractory structures comprising a major quantity of zirconium oxide and 0.01% to 0.1% of a sodium pyrophosphate having an empirical composition between $Na_4P_2O_7$ and $Na_6P_4O_{13}$, 0.005% to 0.1% of sodium silicate, and water.

19. The method which comprises forming a mixture containing a major quantity of zirconium oxide and a minor quantity of a glass melting or softening below 1700° F., and subjecting said mass to an elevated temperature, at which temperature a substantial portion of the constituents of said glass boil away, forming a hard coherent semi-porous structure.

20. The method which comprises forming a mixture containing a major quantity of zirconium oxide and 2% to 8% of a glass melting or softening below 1700° F., and subjecting said mass to an elevated temperature, at which temperature a substantial portion of the constituents of said glass boil away, forming a hard coherent semi-porous structure.

21. A composition suitable for forming refractory structures comprising a major quantity of zirconium oxide, a minor quantity of a glass melting or softening below 1700° F., and a minor quantity of an alkali metal pyrophosphate having an empirical composition between $M_4P_2O_7$ and $M_6P_4O_{13}$, where M represents an alkali metal.

22. A composition suitable for forming refractory structures comprising a major quantity of zirconium oxide, and a minor quantity of an alkali metal pyrophosphate having an empirical composition between $M_4P_2O_7$ and $M_6P_4O_{13}$, where M represents an alkali metal.

23. A composition suitable for forming refractory structures comprising a major quantity of zirconium oxide and 0.01% to 0.1% of a sodium pyrophosphate having an empirical composition between $Na_4P_2O_7$ and $Na_6P_4O_{13}$.

EUGENE WAINER.